3,334,213
PROCESS FOR HOT MACHINING OF METALS
Charles Sauve, Versailles, and Paul David, Chatillon-sous-Bagneux, France, assignors to Commissariat à l'Energie Atomique and Societe Alcatel, both of Paris, France
Filed Dec. 24, 1963, Ser. No. 333,054
Claims priority, application France, Jan. 3, 1963, 920,383
3 Claims. (Cl. 219—154)

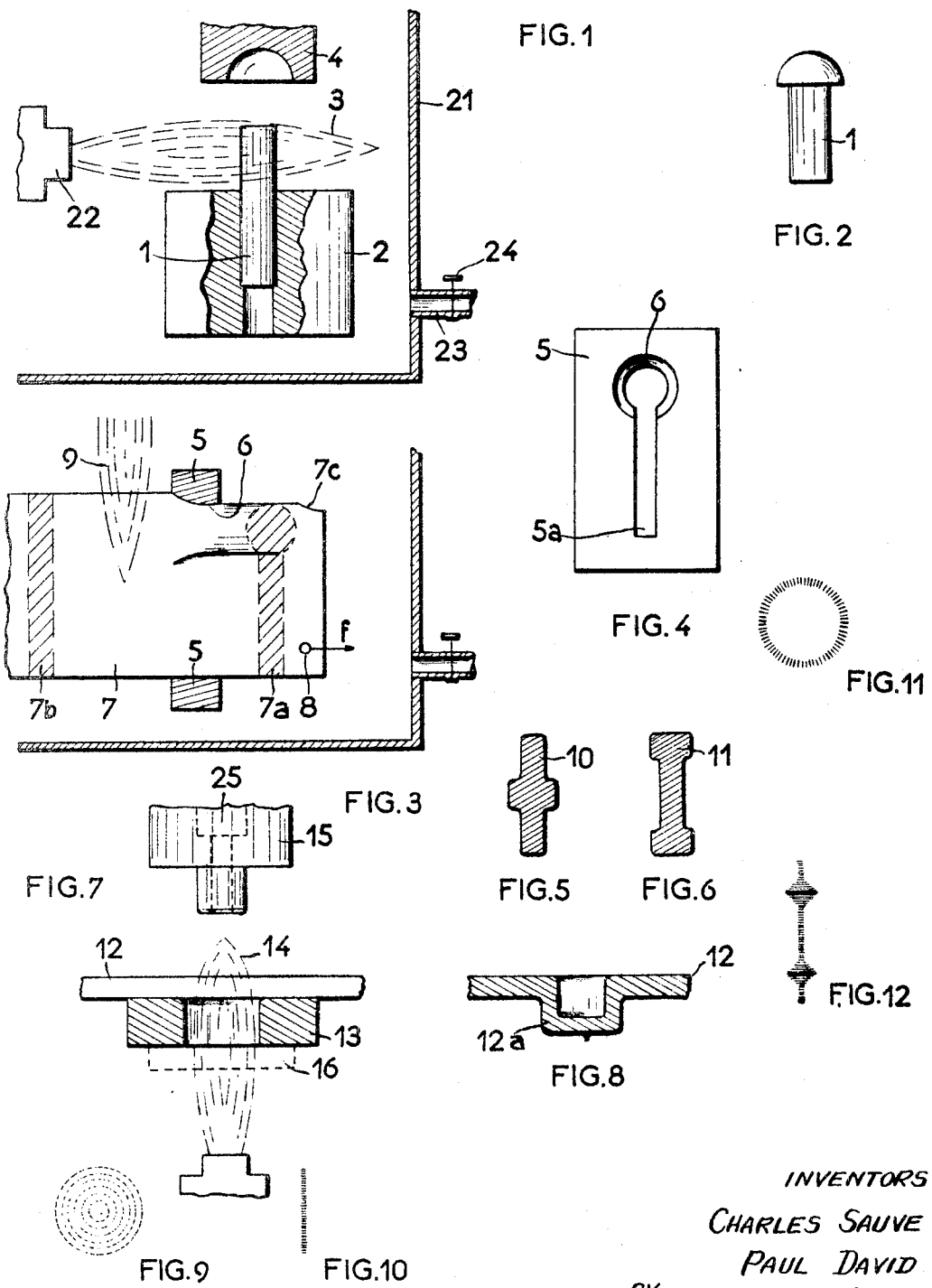

The present invention relates to a process for hot machining of metals which employs the technique of electron bombardment.

It has in fact been found that an electron beam could be focussed either at a point or for a sweeping action over a limited area of a metal to be worked and that it was possible in addition to adapt a number of different tools and equipment of more or less conventional design to the utilization requirements of such an electron beam so as to obtain a hot working of metals which could either not be achieved at all by conventional methods (such as furnace heating, flame heating, radio-frequency heating, etc.) or at least proved extremely complicated and difficult in those cases in which conventional methods were practicable.

The process in accordance with the present invention essentially consists in mounting the workpiece to be machined or worked on a tooling unit which is enclosed within a leak-tight vessel, in creating a vacuum within said vessel, in directing a focussed electron beam solely onto that portion of the workpiece which is intended to be subjected to the machining operation, in heating said portion to the machining temperature while the remainder of said workpiece remains unchanged, in interrupting the heating and in machining the hot portion, the power and shape of the beam being modulated according to the machining operation to be performed.

Only that portion which is to be machined is subjected to the heating process and this latter can be applied over the entire surface and to the precise depth which is necessary without in any way modifying the remainder of the workpiece. The temperature can also be very high and the portions or areas to be machined may be heated even if they are located at a distance from the electron gun and at a point which is practically impossible to reach by any ordinary method of heating.

The invention accordingly has for its object a process which is of particular interest in all cases in which the metal to be worked is a precious metal or a very costly metal and whenever it is found desirable both to avoid oxidation and formation of oxide scale and to prevent loss by burning as a result of the work process which is performed.

A certain number of the above-mentioned operations can be carried out with metal shaping apparatus either in a continuous manner (case of continuous-process extrusion or drawing of metals) while others can be carried out in an interrupted or rhythmical manner (case of die-stamping or strip punching) and the adjustment of the electron beam can readily be performed automatically for the purpose of following an interrupted operation or a rhythmical operation which is in synchronous concordance with this latter. The intensity of the beam can even be modulated so as to follow the requirements of the work which is being performed on the metal by the tool and while the operation is in progress.

The operations which can be carried out in accordance with this process are very numerous. There can be mentioned by way of example die-stamping and drop forging; hot bending either by disc or roller-die; hot extrusion and drawing; strip punching; milling; threading by hot rolling and other conventional machining processes.

A few of these examples which are not given in any limiting sense are described in greater detail hereinafter, reference being made to the accompanying drawings, in which:

FIG. 1 shows diagrammatically, partly in cross-section, a workpiece which is set in position within a die-stamping tooling unit and which is subjected locally to the electron bombardment process;

FIG. 2 illustrates the finished part which is thus obtained;

FIG. 3 is a profile view of a workpiece which is fitted in a drawing die-plate and which is subjected locally to the electron bombardment process;

FIG. 4 shows the drawing die-plate looking on the front;

FIGS. 5 and 6 illustrate in transverse cross-section parts which are thus obtained by drawing;

FIG. 7 shows a workpiece which is set in position on the die of a forging press and which is subjected locally to the action of an electron beam;

FIG. 8 illustrates the stamped part in cross-section;

FIGS. 9 to 12 show different forms of sweeping action of the electron beam on the workpiece to be machined with a view to producing a number of different heating traces.

In accordance with the invention, the machining operation is carried out within a leak-tight vessel in which is mounted the necessary tooling equipment. The workpiece to be processed is set in position on said equipment, whereupon the vessel is closed and a vacuum created therein. An electron beam is then directed onto the workpiece at the exact point at which said workpiece is to be machined, the intensity of said beam as well as the shape of the surface on which it acts being adjusted according to the nature of the metal of the workpiece and the machining to be performed. As soon as the temperature which is reached within the workpiece is sufficient, the heating is stopped and the machining operation commenced. Depending on requirements, the interruption of the heating can be brought about by a stoppage of the electron gun or simply by withdrawal of the heating point, for example by displacement of the part within the die assembly, the gun in that case heating another point of the same workpiece.

The power of the beam which is emitted by the electron gun is modulated in such a manner as to reach the entire portion to be worked and to reach that portion alone. The shape of the heated surface can also be adjusted either by sweeping or by deflection of the beam and can thus be made to correspond exactly to the shape of the portion to be machined irrespective of the complexity thereof, as shown in FIGS. 9 to 12 which show the different traces which are obtained by means of an electron beam. FIGS. 11 and 12 in particular show the paths which are obtained respectively by deflection of the beam and by the combination of a deflection and a modulation.

Around the periphery of said beam, the material constituting the workpiece to be machined is not subjected to any heating and remains intact. Accordingly, in the case of materials which are formed of precious metals and which present difficulty in machining, the process in accordance with the invention permits the possibility of subjecting such metals to a heat treatment at a very high temperature and of applying such treatment only at one precise point. The quality of the remainder of the workpiece is therefore in no way liable to be modified by generalized heating. There is also no danger of loss by burning and evidently no oxidation since the operation is conducted in vacuo. Moreover, such metals can thus be machined without difficulty.

The characteristic features and advantages of this process will in any case become more readily apparent from the following examples of treatment and machining operations of various kinds.

Example 1

This example relates to the die-stamping of rivet heads in a machine which works in step-by-step operation.

FIG. 1 shows diagrammatically the tooling equipment which is necessary for the said die-stamping operation, said equipment being placed within a leak-tight vessel 21 which also contains an electron gun 22. For the sake of clarity of the figure, the combined assembly which comprises the leak-tight vessel, electron gun and die-stamping equipment has been shown only partially.

The die-stamping equipment consists of a lower die 2 which holds the workpiece to be machined and an upper die or upsetting die 4. As soon as the rod 1 to be machined is placed within the lower die 2, the vessel is hermetically closed and a vacuum pump (not shown) which is connected to the vessel 21 through a conduit 23 is put into operation. The conduit 23 is fitted with a valve 24 which is shut off as soon as the requisite degree of vacuum is reached within the vessel 21 and the pump is then stopped.

The electron gun is then excited and directs onto the rod 1 an electron beam 3 which is shown in broken lines in the figure. When the heating temperature is reached, the electron beam is cut off and the upsetting die 4 is applied on the heated portion so as to deform it and obtain a part having the shape which is illustrated in FIG. 2.

Example 2

This example relates to the hot drawing process.

In this case, use is made of a drawing die 5, as shown in FIG. 3, for the purpose of obtaining the desired configuration $5_a$ which is shown in FIG. 4. The said die is provided on its front face and at the top portion thereof with an inlet 6 forming a throat so as to produce a drawing-down action.

Prior to insertion through the die-plate, the strip 7 to be drawn has a cross-section $7_b$ which is shown in broken-outline shading. The said strip is intended to be provided with a hole 8 or like means for fastening to the draw gear coupling. A preliminary shape $7_c$ is intended to be formed at the extremity of the strip 7 to be drawn and has for its object to permit this latter to be inserted through the die-plate 5.

As in the previous case, this tooling equipment is placed within a leak-tight vessel in which a vacuum is created after the strip 7 to be drawn has been set in position in the die-plate 5.

An electron beam 9 is then directed onto the portion which is to be drawn.

When the beam has been set in action and the temperature of the heated portion is suitable for shaping by drawing, the coupling which exerts a tractive effort in the direction of the arrow $f$ pulls the strip through the die-plate and shapes said strip according to the profile $7_a$ which is shown in broken-outline shading.

During this operation, the entire lower portion of the strip is not heated and therefore retains all the mechanical qualities which are essential for the purpose of allowing a suitable tractive effort to be exerted on said lower portion in the course of the drawing process. The same would not apply if the entire strip had been heated by conventional methods.

It is thus possible to produce parts having a wide variety of profiles such as that of the part 10 (as shown in FIG. 5) and that of the part 11 (as shown in FIG. 6), reference being made to these profiles only by way of example without any limitation being implied.

Example 3

This example relates to die-stamping in a strip. In the interior of the vessel in which a vacuum has been created, the strip 12 to be stamped (as shown in FIG. 7) passes in front of the female portion or die 13 proper.

The electron beam 14 can be supplied from an electron gun $22a$ which is placed beneath the die 13, the beam being intended to pass through said die as shown in the figure, or alternatively, the said beam can pass through the punch 15 by means of a bore 25 as shown in broken lines. At the moment when the desired temperature is reached, the beam is stopped and a workpiece 16 which is shown in broken lines is brought into position beneath the die at the moment when the punch 15 is lowered in order to perform its operation. There is thus formed in the strip 12 a stamped portion $12_a$ as shown in FIG. 8.

An additional advantage of the process in accordance with the present invention lies in the fact that is permits the possibility of modifying the electron beam by focussing the beam, in such a manner that, instead of a point trace, there can be formed a diffused trace 17 according to the heating requirements of the portion to be worked, as shown in FIG. 9.

Provision can also be made for a sweeping or a deflection of the beam on the workpiece with a view to obtaining various kinds of traces such as the trace 17 (as shown in FIG. 9), the trace 18 (as shown in FIG. 10) and the trace (as shown in FIG. 11), these latter being mentioned solely by way of example.

Furthermore, it is possible to modulate the power of the beam so as to obtain more or less hot portions 20 (as shown in FIG. 12) according to requirements..

It will be apparent that the different forms of beam which have been mentioned in the foregoing, as employed in combination with the equipment which is adapted to such different forms and to the work to be performed, permit a large number of combinations which are not obtainable by means of conventional methods.

What we claim is:

1. A process for continuously shaping metal, comprising the steps of: positioning a metal workpiece within a leak-tight vessel; creating a vacuum within said vessel; directing a focussed and shaped electron beam onto a first portion of the workpiece whereby to heat said first portion up to a temperature below its melting point and sufficient to soften said portion; withdrawing the heated first portion from the beam and bringing a second portion of said workpiece opposite said beam; shaping said heated first portion in said vacuum in said vessel to a predetermined shape while at the same time heating said second portion up to said temperature; discontinuing the shaping of said heated first portion; withdrawing the heated second portion from the beam and bringing a third portion of said workpiece opposite said beam; and shaping in said vacuum in said vessel said heated second portion to said predetermined shape while at the same time heating said third portion up to said temperature.

2. A process for shaping metal, comprising the steps of: positioning a metal workpiece adjacent a forming die within a leak-tight vessel; creating a vacuum within said vessel; directing a focussed and shaped electron beam solely onto that portion of the workpiece which is to be shaped whereby to heat said portion to a temperature below its melting point and sufficient to soften said portion for shaping by a drawing operation; the remainder of said workpiece not being heated; and in shaping in said vacuum in said vessel said heated portion by drawing said workpiece through said forming die to form said heated portion to a predetemined shape conforming to the shape of the forming die.

3. Process in accordance with claim 1 wherein the power of the beam is variable as a function of the temperature to be reached within the heated portions.

References Cited
UNITED STATES PATENTS

| | | | |
|---|---|---|---|
| 2,507,817 | 5/1950 | Ropp et. al. | 219—150 |
| 2,793,282 | 5/1957 | Steigerwald | 219—69 |
| 2,981,823 | 4/1961 | Candidus | 219—121 |
| 3,135,855 | 6/1964 | Barber | 210—72 X |

ANTHONY BARTIS, *Primary Examiner.*

RICHARD M. WOOD, *Examiner.*

B. A. STEIN, *Assistant Examiner.*